(12) United States Patent
Pearson

(10) Patent No.: US 11,628,683 B2
(45) Date of Patent: Apr. 18, 2023

(54) WHEEL ADAPTER TO CONVERT A STORAGE CONTAINER TO A WHEELED STORAGE CONTAINER

(71) Applicant: CABELA'S LLC, Sidney, NE (US)

(72) Inventor: Stephen Pearson, Sidney, NE (US)

(73) Assignee: CABELA'S LLC, Sidney, NE (US)

( * ) Notice: Subject to any disclaimer, the term of this patent is extended or adjusted under 35 U.S.C. 154(b) by 197 days.

(21) Appl. No.: 17/215,821

(22) Filed: Mar. 29, 2021

(65) Prior Publication Data

US 2021/0283945 A1 Sep. 16, 2021

Related U.S. Application Data

(62) Division of application No. 15/835,880, filed on Dec. 8, 2017, now Pat. No. 10,960,706.

(60) Provisional application No. 62/434,302, filed on Dec. 14, 2016.

(51) Int. Cl.
| | | |
|---|---|---|
| *B60B 3/14* | (2006.01) | |
| *A45C 11/20* | (2006.01) | |
| *B60B 3/00* | (2006.01) | |
| *B60B 33/00* | (2006.01) | |
| *B60B 3/16* | (2006.01) | |
| *A45C 5/14* | (2006.01) | |
| *B62B 1/20* | (2006.01) | |

(52) U.S. Cl.
CPC ............ *B60B 3/147* (2013.01); *A45C 5/143* (2013.01); *A45C 11/20* (2013.01); *B60B 3/001* (2013.01); *B60B 33/0007* (2013.01); *B60B 33/0026* (2013.01); *B60B 33/0063* (2013.01); *A45C 2005/148* (2013.01); *B60B 3/14* (2013.01); *B60B 3/16* (2013.01); *B60B 2200/45* (2013.01); *B62B 1/20* (2013.01); *B62B 2205/104* (2013.01)

(58) Field of Classification Search
CPC ..... B60B 3/147; B60B 3/001; B60B 33/0007; B60B 33/0026; B60B 33/0063; B60B 3/14; B60B 3/16; B60B 2200/45; A45C 5/143; A45C 11/20; A45C 2005/148; B62B 1/20; B62B 2205/104; B65D 25/24; Y10T 16/19; Y10T 16/203
See application file for complete search history.

(56) References Cited

U.S. PATENT DOCUMENTS

| | | |
|---|---|---|
| 102,253 A | 4/1870 | Grosse |
| 3,493,085 A | 2/1970 | Libhart |
| 3,761,107 A | 9/1973 | Docherty et al. |
| 3,987,875 A * | 10/1976 | Szabo .................... A45C 13/00 16/30 |
| 4,262,780 A | 4/1981 | Samuelian |

(Continued)

*Primary Examiner* — Sarang Afzali
*Assistant Examiner* — Darrell C Ford
(74) *Attorney, Agent, or Firm* — King & Spalding LLP

(57) ABSTRACT

A wheel adapter to convert a storage container to a wheeled storage container is provided. The wheel adapter comprises a mounting bracket attachable to the storage container. The mounting bracket comprises a first leg configured to engage a bottom surface of the storage container, and a second leg configured to engage a side surface of the storage container. The second leg comprises a wheel coupling. The wheel adapter also includes a wheel rotatably connected to the wheel coupling. The wheel is constructed and arranged for rotation about an axis to provide rolling support of the storage container on the ground.

12 Claims, 14 Drawing Sheets

(56) References Cited

U.S. PATENT DOCUMENTS

| | | | | |
|---|---|---|---|---|
| 4,332,052 A | * | 6/1982 | Remington | B60B 33/0002 248/225.11 |
| 4,335,896 A | * | 6/1982 | Koffler | A45C 5/143 16/30 |
| 4,422,212 A | | 12/1983 | Sheiman et al. | |
| 4,424,604 A | | 1/1984 | Dupuis | |
| 4,772,035 A | | 9/1988 | Danial | |
| 5,136,751 A | | 8/1992 | Coyne et al. | |
| 5,426,817 A | * | 6/1995 | Rekuc | A45C 5/14 16/29 |
| 6,183,405 B1 | | 2/2001 | Schurig | |
| 6,473,935 B1 | * | 11/2002 | Cherukuri | B60B 33/0063 16/33 |
| 6,594,856 B1 | * | 7/2003 | Cherukuri | B60B 33/0005 16/33 |
| 6,604,616 B2 | * | 8/2003 | Cheng | A45C 5/02 190/122 |
| 7,600,294 B2 | * | 10/2009 | Hartman | B60B 33/0018 16/31 R |
| 8,925,752 B2 | * | 1/2015 | Smith | F25D 23/028 220/4.27 |
| 9,278,704 B2 | * | 3/2016 | Cates | A45C 5/14 |
| 9,415,787 B2 | * | 8/2016 | Mericle | B62B 5/0086 |
| D881,683 S | | 4/2020 | Pearson | |
| 11,008,030 B2 | * | 5/2021 | Cohen | B62B 5/0083 |
| 2004/0020008 A1 | * | 2/2004 | Harris | B60B 33/0068 16/35 R |
| 2006/0180421 A1 | * | 8/2006 | Godshaw | A01K 1/0254 190/18 A |
| 2011/0061198 A1 | * | 3/2011 | Fan | B60B 33/0005 16/31 R |
| 2012/0273505 A1 | * | 11/2012 | Bose | A45C 13/02 220/592.16 |
| 2015/0075208 A1 | * | 3/2015 | Lockwood | F25D 11/003 62/407 |
| 2015/0115555 A1 | * | 4/2015 | Cates | B62B 5/0089 280/47.26 |
| 2015/0191190 A1 | * | 7/2015 | Richardson | B62B 5/0083 280/47.34 |
| 2015/0239484 A1 | * | 8/2015 | Mericle | B62B 5/0086 280/35 |
| 2016/0121916 A1 | * | 5/2016 | Kassab Arabo | B62B 3/025 280/37 |
| 2017/0343247 A1 | * | 11/2017 | Ahmad | F25D 31/005 |
| 2018/0038624 A1 | * | 2/2018 | Huish | A45C 11/20 |

* cited by examiner

WHEEL ADAPTER TO CONVERT A STORAGE CONTAINER TO A WHEELED STORAGE CONTAINER

CROSS-REFERENCE TO PRIOR APPLICATION

This present patent application is a divisional of U.S. patent application Ser. No. 15/835,880 filed Dec. 8, 2017, which claims priority to and benefit to U.S. Patent Provisional Application Ser. No. 62/434,302 filed Dec. 14, 2016, and entitled "Cooler With Integrated Wheels," the contents of which are incorporated herein by reference in their entirety.

FIELD

The present patent application generally relates to improving the mobility of a storage container.

BACKGROUND

Food coolers (coolers) may be used to keep perishable foods items cool or cold during outdoor activities, such as hiking, camping and/or hunting. It may be desirable to bring the coolers (full of food) to areas where the coolers will have to be transported by hand. However, many coolers are constructed using heavy durable materials with thick layers of insulation, making the coolers heavy and cumbersome to carry, particularly when full of food items.

Placing the cooler on a dolly takes time, requires the additional transportation of the dolly and allows the cooler to slide off of the dolly in rough conditions such as those often encountered during such activities as hiking, camping and/or hunting.

Traditional methods of attaching wheels to a cooler are not robust enough and may allow the wheels to break off of the cooler and/or the methods do not allow the cooler to safely sit on a flat surface without sliding or scratching the surface when the wheels are not in use.

Thus, what is needed is a system and a method for improving the mobility of the cooler or storage container.

SUMMARY

One aspect of the present patent application provides a method of replacing original pads on a cooler with brackets having replacement pads and wheels. The brackets may be attached to the cooler using the same holes used by the original pads. The brackets may be configured to allow the cooler to be supported by other original pads and the replacement pads of the bracket (and not the wheels) when at rest on a surface and to allow the cooler to be supported by the wheels (and not the original or replacement pads) when rolled upon the ground. This bracket may be attached using fasteners to the bottom surface of the cooler while wrapping around a bottom edge of the cooler to contact a side surface of the cooler to provide additional support for the wheels.

Another aspect of the present patent application provides a wheel adapter to convert a storage container to a wheeled storage container. The wheel adapter comprises a mounting bracket attachable to the storage container. The mounting bracket comprises a first leg configured to engage a bottom surface of the storage container and a second leg configured to engage a side surface of the storage container. The second leg comprises a wheel coupling. The wheel adapter also includes a wheel rotatably connected to the wheel coupling. The wheel is constructed and arranged for rotation about an axis to provide rolling support of the storage container on the ground.

These and other aspects of the present patent application, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. In one embodiment of the present patent application, the structural components illustrated herein are drawn to scale. It is to be expressly understood, however, that the drawings are for the purpose of illustration and description only and are not intended as a definition of the limits of the present patent application. It shall also be appreciated that the features of one embodiment disclosed herein can be used in other embodiments disclosed herein. As used in the specification and in the claims, the singular form of "a", "an", and "the" include plural referents unless the context clearly dictates otherwise. In addition, as used in the specification and the claims, the term "or" means "and/or" unless the context clearly dictates otherwise. It should also be appreciated that some of the components and features discussed herein may be discussed in connection with only one (singular) of such components, and that additional like components which may be disclosed herein may not be discussed in detail for the sake of reducing redundancy.

DETAILED DESCRIPTION

Figure 1:
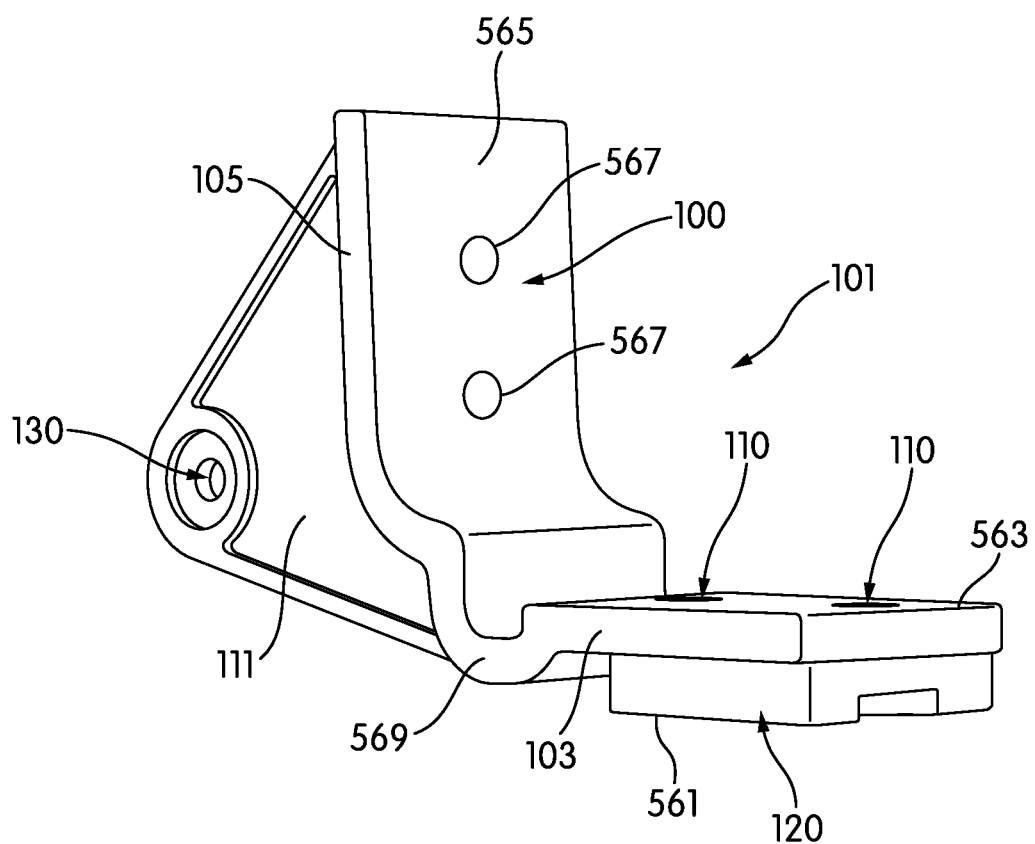
FIGS. 1, 2, 3, and 4 show various perspective views of a mounting bracket that is attachable to a storage container to assist in transporting the storage container in accordance with an embodiment of the present patent application, wherein the mounting bracket includes axle holders for retaining a wheel and a ground engaging pad to allow the storage container to safely lie on a ground surface without sliding or scratching the ground surface.
Figure 2:
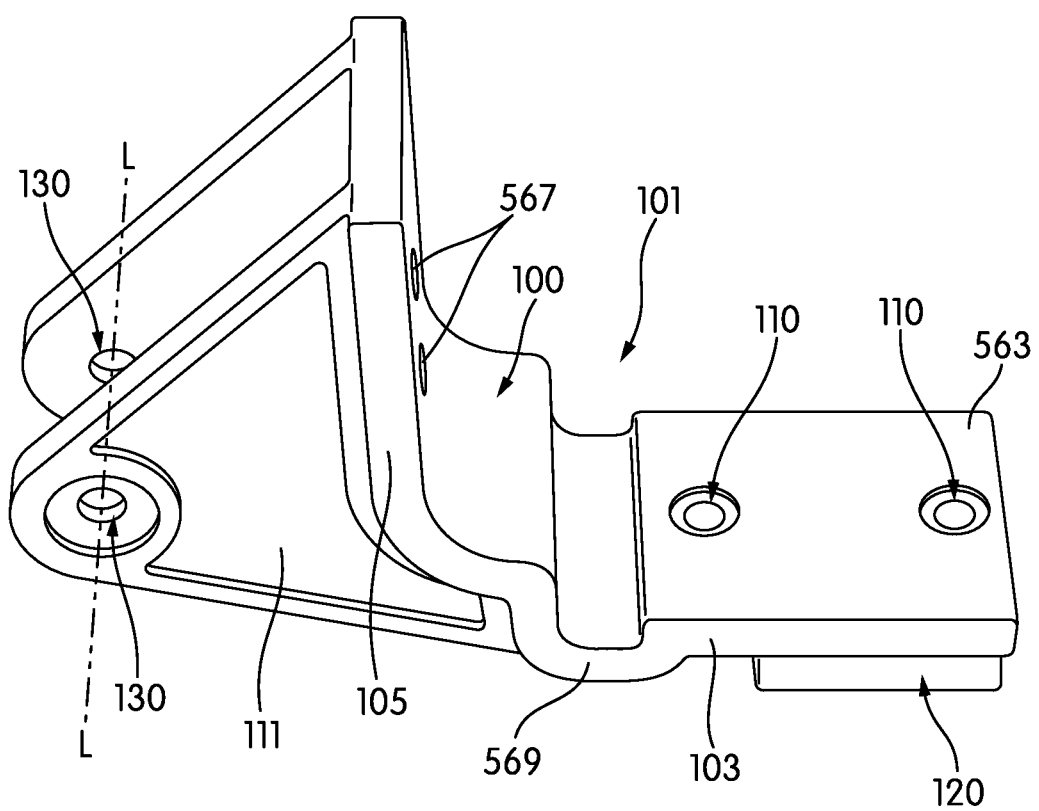
Figure 3:
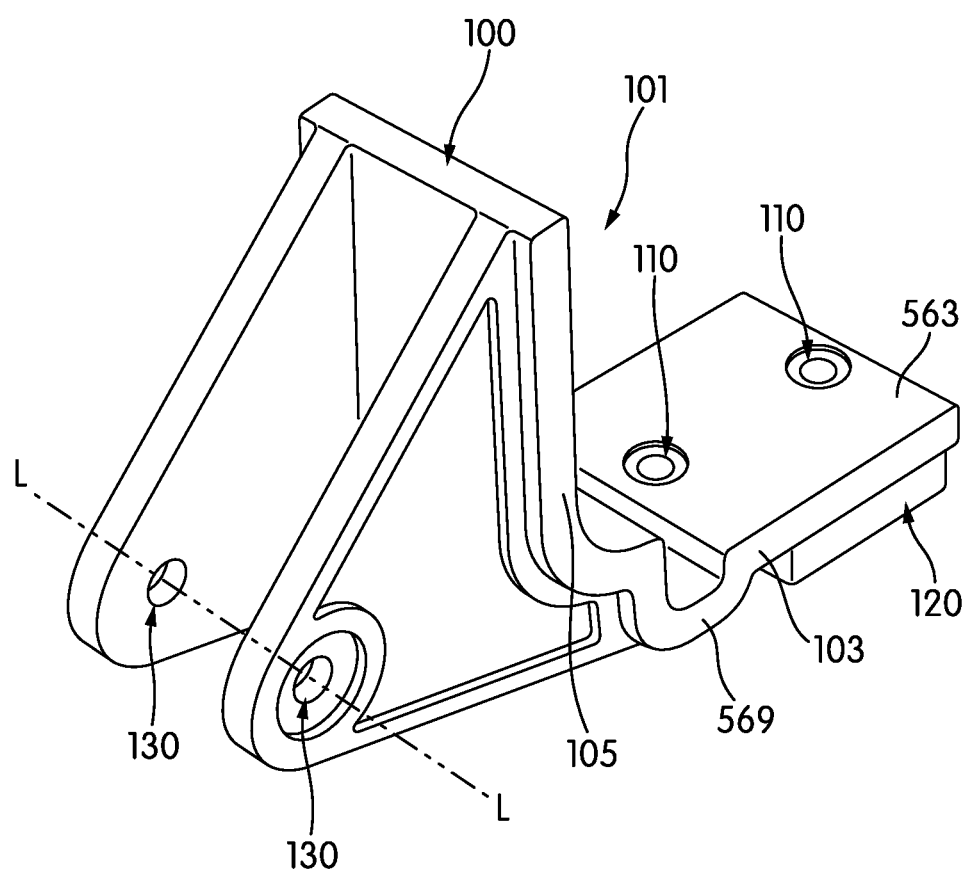
Figure 4:
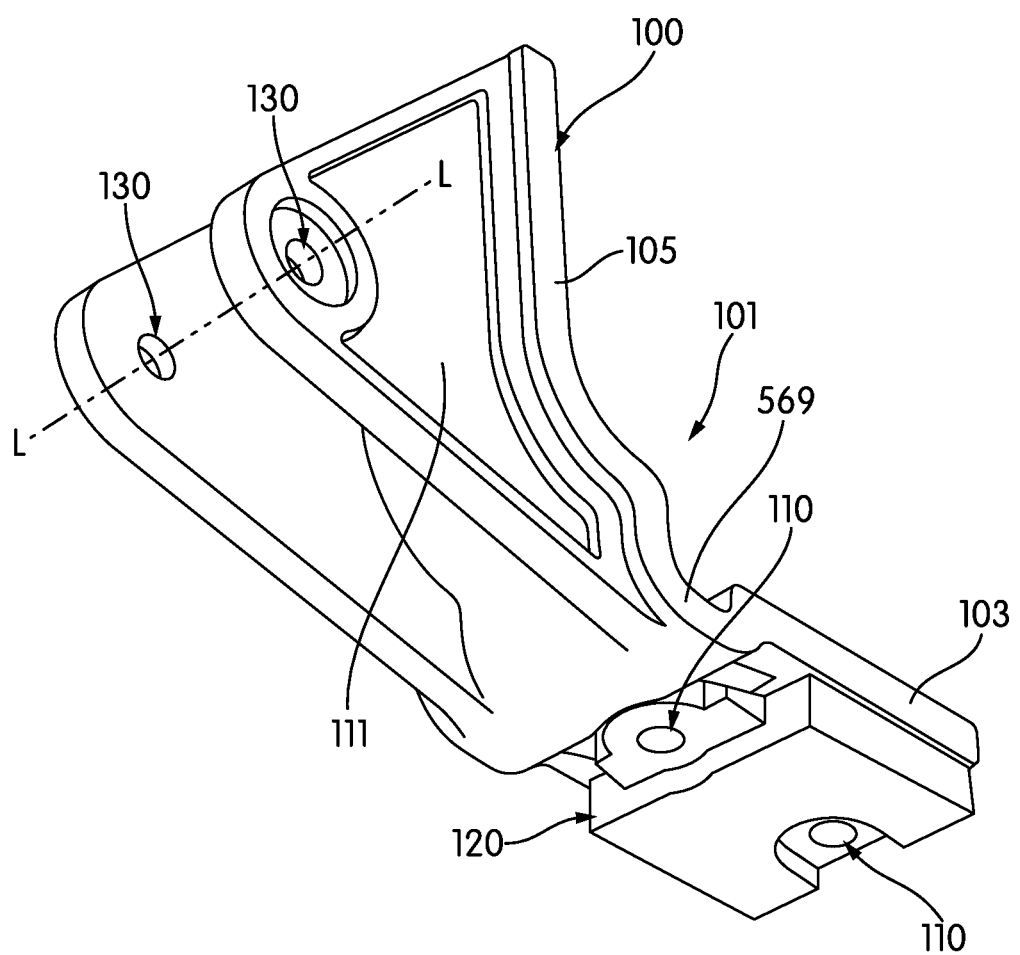
Figure 5:
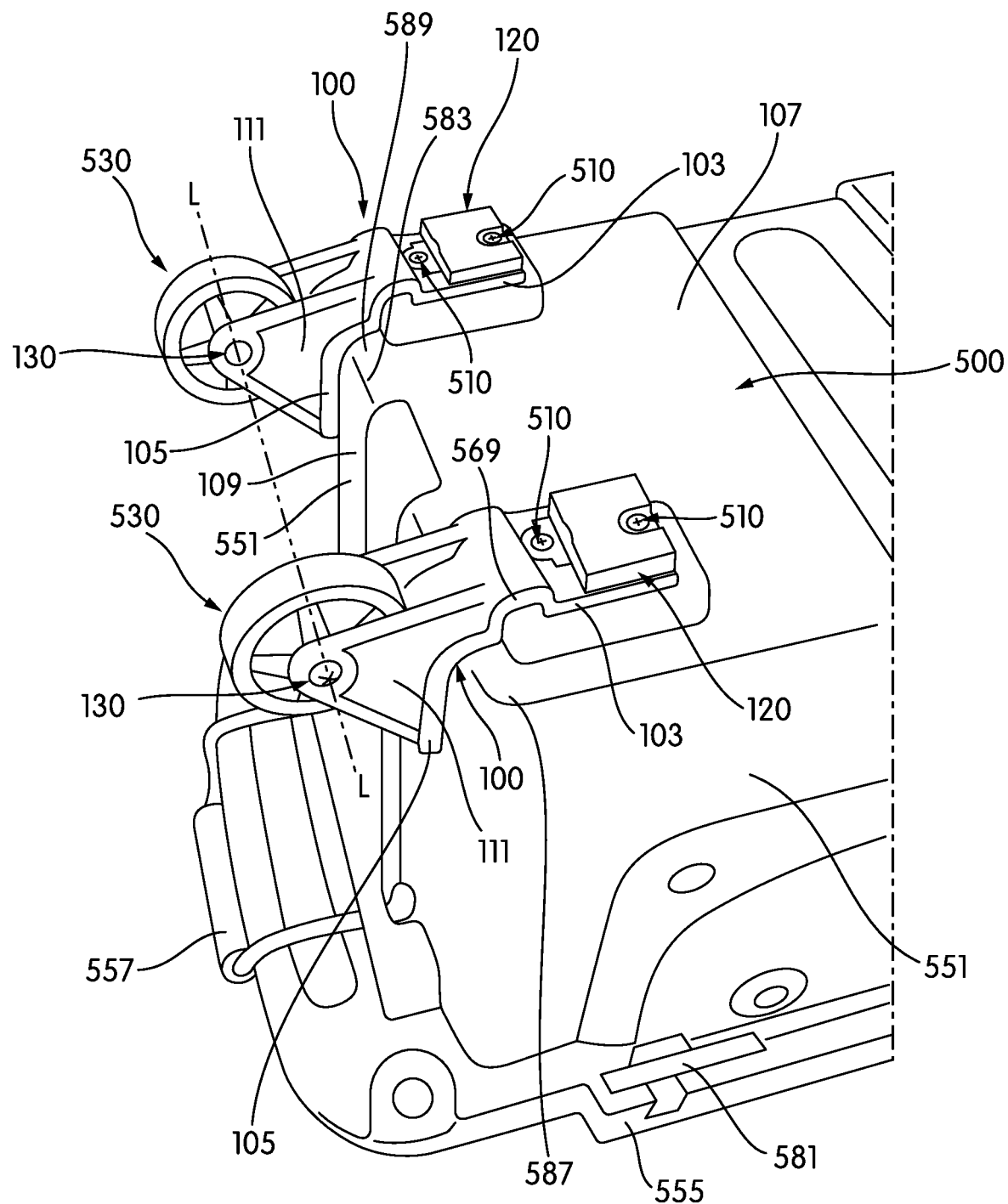
FIGS. 5-6 show various perspective views of two mounting brackets attached to the storage container to assist in transporting the storage container in accordance with an embodiment of the present patent application.
Figure 6:
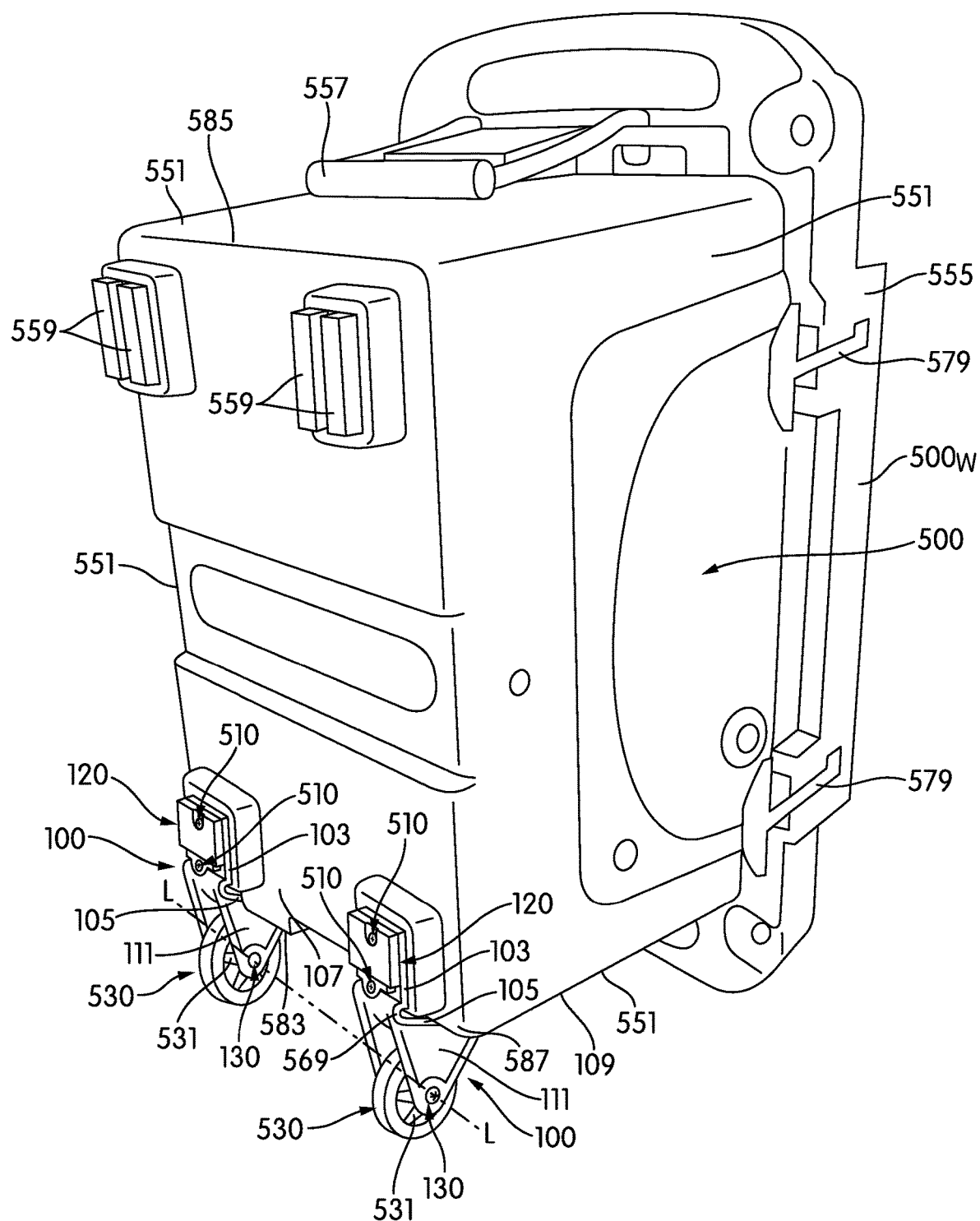

The present patent application will now be discussed in detail with regard to the attached drawing figures that were briefly described above. In the following description, numerous specific details are set forth illustrating the Applicant's best mode for practicing the present patent application and enabling one of ordinary skill in the art to make and use the present patent application. It will be obvious, however, to one skilled in the art that the present patent application may be practiced without many of these specific details. In other instances, well-known machines, structures, and method steps have not been described in particular detail in order to avoid unnecessarily obscuring the present patent application. Unless otherwise indicated, like parts and method steps are referred to with like reference numerals.

Figure 7A:
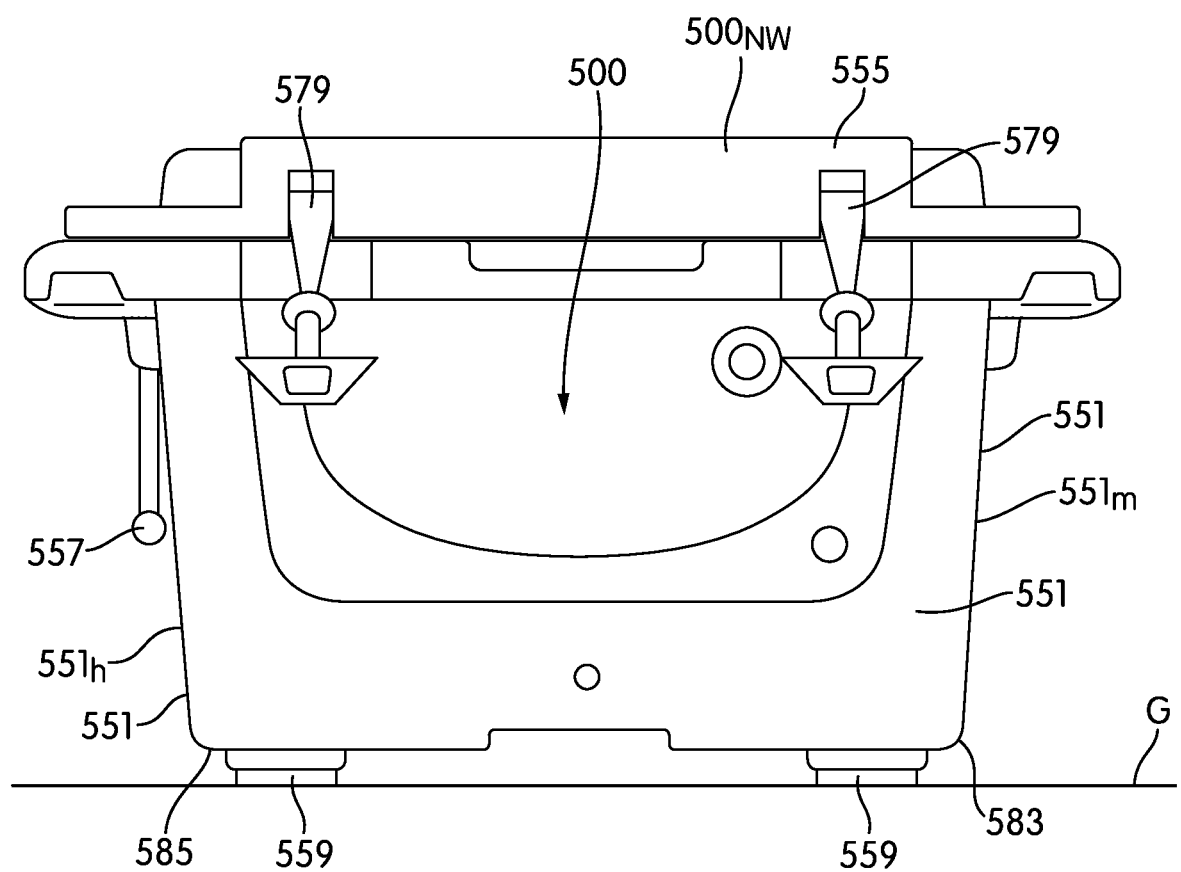
FIG. 7A shows the storage container before the mounting brackets are attached in accordance with an embodiment of the present patent application.

Many food coolers (coolers 500) without wheels (e.g., such as shown in FIG. 7A) have been sold to customers for such activities as hiking, camping and/or hunting. These coolers 500 are often very heavy due to the coolers 500 rugged construction and thick insulation as well as the food in the coolers 500. Users of the coolers 500 may desire to upgrade or improve their existing coolers 500 to make their coolers 500 easier to transport.

The present patent application provides a system and a method for attaching wheels 530 to the cooler/storage container 500 that allows the wheels 530 to be firmly attached to the cooler/storage container 500 and also allow the cooler/storage container 500 to sit on a flat surface without sliding or scratching the ground surface G.

Referring to FIGS. 1-12, a user U of the cooler 500 may improve the mobility of an existing cooler 500 or $500_{NW}$ (as shown in FIG. 7A) by adding or attaching two mounting brackets 100 to the cooler 500, wherein each mounting bracket 100 retains the wheel 530. In one embodiment, the cooler 500 may start with one or more pads 559 on the bottom (i.e., under surface) of the cooler 500. In one embodiment, these coolers 500 may have four pads attached near the four corners of the outside/external bottom surface of the cooler 500. The four pads may be used to allow the cooler 500 to safely rest against a top surface of a table or any other surface without sliding and/or scratching the surface. In one embodiment, the number of ground engaging pads 559 attached to the cooler 500 may vary. In yet another embodiment, the ground engaging pads 559 are optional as described in detail below.

Two or more of the pads 559 may be attached to the bottom outside/external surface of the cooler 500 by one or more fasteners. Fasteners may include screws, bolts (e.g., with washers and nuts), nails, tacks and/or rivets. In one embodiment, each pad 559 is attached to the bottom outside surface of the cooler 500 by two fasteners. In other embodiments, the number of fasteners may vary.

In one embodiment, the user U may detach two of the pads 559 from the same bottom edge 583 (see FIGS. 5-7C) of the cooler 500 by removing the pads' corresponding fasteners. In one embodiment, if two screws are being used to hold a single pad 559, four screws may be removed so that two pads 559 (two screws for each pad) may be removed from the bottom surface of the cooler 500. The cooler 500, at this point, may have two pads 559 still attached (on the opposite edge 585, see FIGS. 6-7C) to the bottom of the cooler 500 and two empty holes 110 (such as screw or bolt holes) in a first corner 587 and two empty holes 110 (such as screw or bolt holes) in a second corner 589. In one embodiment, the first corner 587 and the second corner 589 are along the same bottom edge 583 of the cooler 500.

In one embodiment, the user U may attach a first mounting bracket 100 to the first bottom corner 587 of the cooler 500 and a second mounting bracket 100 to the second bottom 589 corner of the cooler 500 as illustrated in FIGS. 5-7C. For each mounting bracket 100 to be able to use the same holes 110 as the pad being removed, each mounting bracket 100 has holes 110 (e.g., screw or bolt holes) that match the pattern and dimensions of the holes in the pad being removed.

In one embodiment, for example, if the pad being removed used two screws of diameter A separated by length B, then the mounting bracket 100 has two screw holes 110 of diameter A separated by length B. This allows the mounting brackets 100 to be attached to the cooler 500 using one or more fasteners without having to create new holes 110 in the cooler 500. In other words, the mounting brackets 100 may use the same existing holes 110 in the cooler 500 as the removed pads. Thus, two screws or two bolts may be used to attach each bracket 100 to the bottom surface of the cooler 500 without drilling or creating new holes in the cooler 500.

In one embodiment, the same fasteners may be used for the mounting brackets 100 as was used for the original pads. In other embodiments, the fasteners for the mounting brackets 100 may be made shorter or longer than the fasteners used for the original pads, as long as the fasteners use the same holes in the cooler 500.

In one embodiment, each mounting bracket 100 may include two axle holders 130 for retaining the wheel 530 that may rotate while attached to the mounting bracket 100. Each axle holder 130 may be able to receive and retain one end of an axle of a wheel. Thus, the two axle holders 130 are able to receive and retain both ends of an axle 131 of the wheel 530.

Figure 7B:
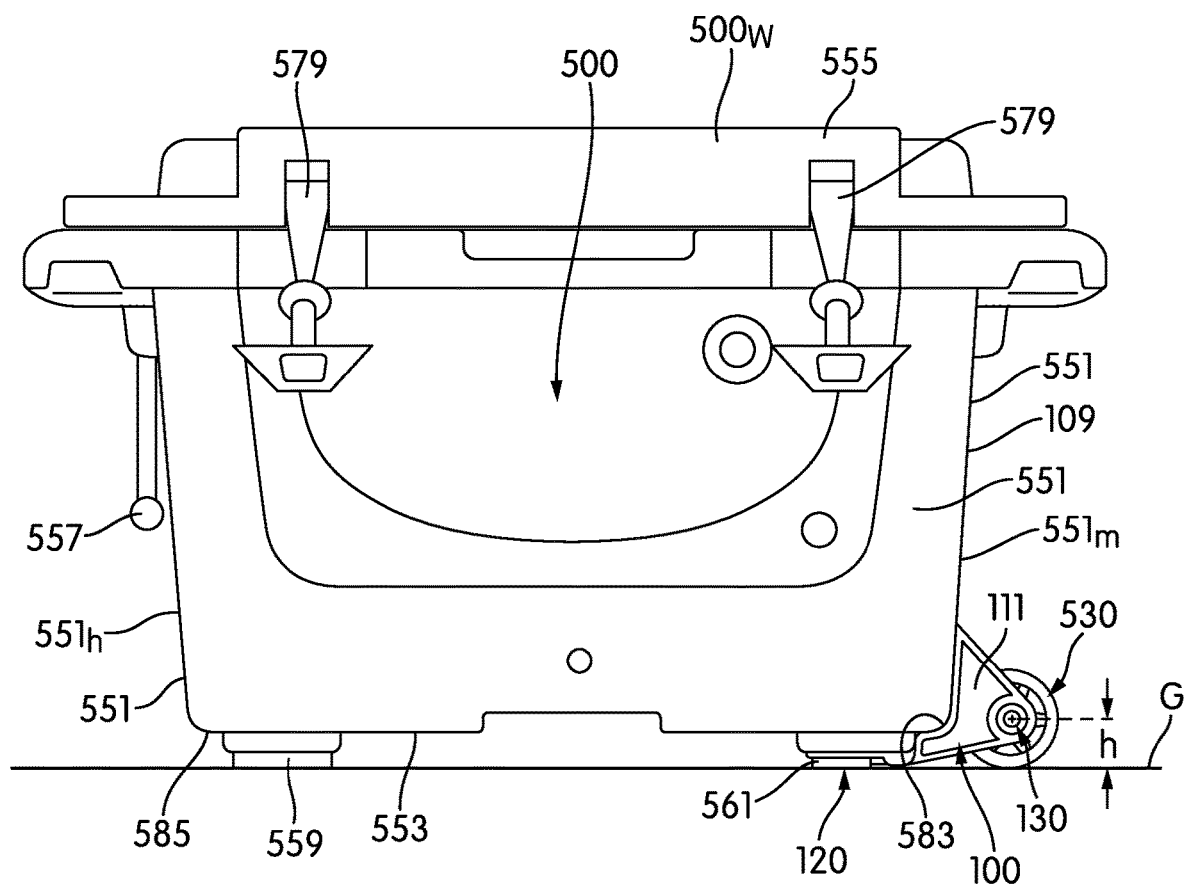
FIG. 7B shows the storage container after the mounting brackets are attached in accordance with an embodiment of the present patent application.

As the process of installing the mounting brackets 100 generally requires the removal of two of the original pads 559, each mounting bracket 100 may include its own pad 120 that provides the same benefits as the original pad. The new pads 120 are generally durable (e.g., such as a hard rubber) and may support the cooler 500 when the cooler 500 is on a table or the ground G. In one embodiment, the cooler 500 is supported by two original pads 559 and two new pads 120 that are part of the mounting bracket 100 when the cooler 500 is at rest on a table or the ground G as illustrated in FIG. 7B. When the cooler 500 is at rest on a table or on the ground G, the wheels 530 are not touching the table or the ground G. In one embodiment, when the cooler 500 is at rest on a table or on the ground G, the wheels 530 are only lightly in contact with the table or the ground G.

In one embodiment, the wheels 530 allow the user U to grasp and raise one end (without the wheels 530) of the cooler 500, while the wheels 530 on the other end of the cooler 500 support the cooler 500 and allow the cooler 500 to roll along the ground G. When the cooler 500 is being transported using the wheels 530 in this manner, the original pads 559 and the pads 120 of the mounting brackets 100 are raised and not touching the surface G that the wheels 530 are being rolled upon.

In one embodiment, as can be seen in FIGS. 5-7C, each mounting bracket 100 wraps around a bottom outside edge of the cooler 500 so that each mounting bracket 100 is in contact with bottom surface 107 and same side surface 109 of the cooler 500. In the illustrated embodiments, the mounting bracket 100 is only connected to the cooler 500 through the bottom surface 107 as the bottom surface 107 already has the preexisting holes that were used by the original pads. In one embodiment, the mounting bracket 100 may be attached/connected to both the bottom surface 107 and the side surface 109 of the cooler 500.

While the illustrated mounting bracket 100 and axle holders 130 do not allow the wheels 530 to swivel, other types of rollers or wheels may also be attached to the bottom of the cooler 500 using the existing holes to allow for different degrees of freedom for the wheels 530 as would be appreciated by one skilled in the art.

Figure 7C:
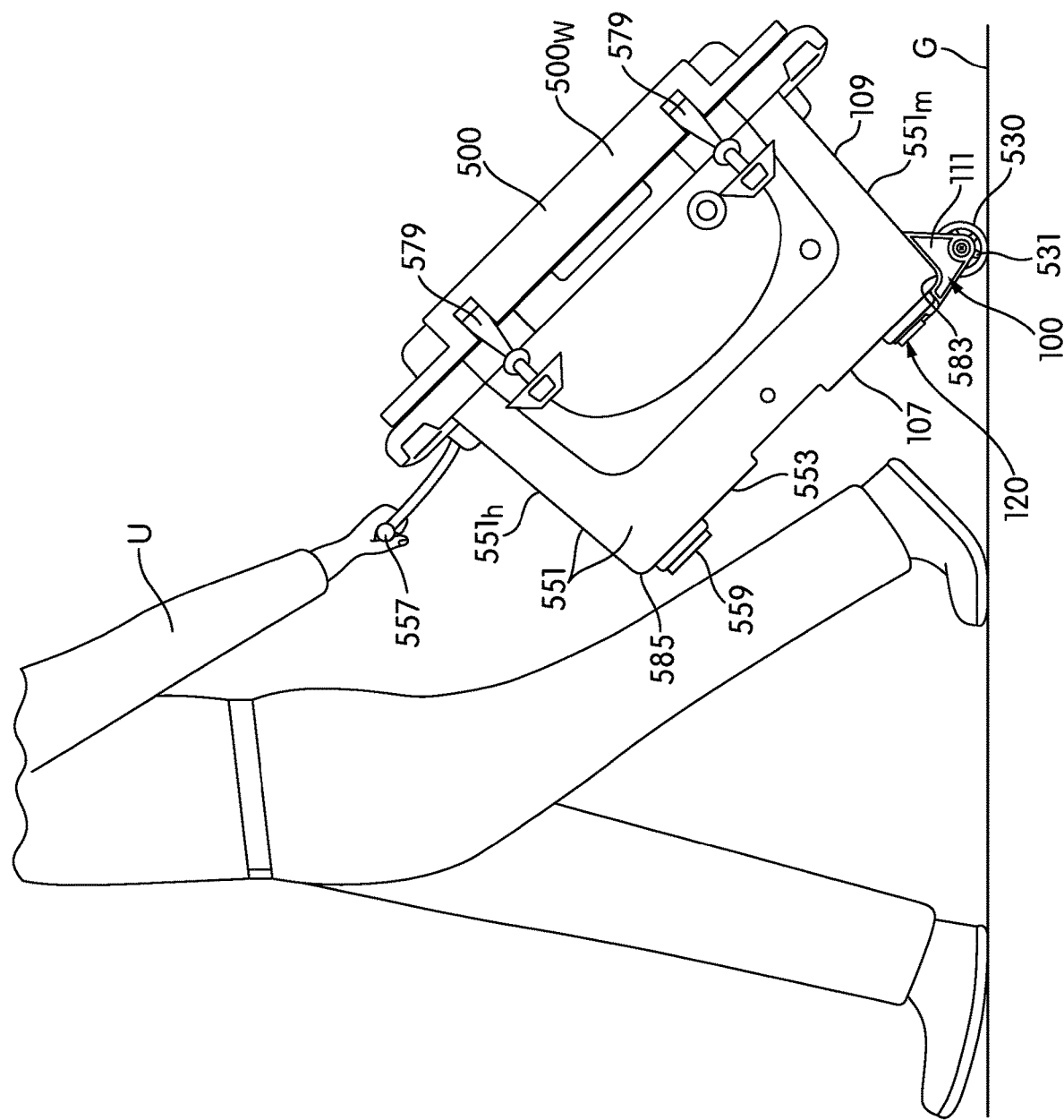
FIG. 7C shows the storage container in its tilted rolling configuration (i.e., on the wheels of the attached mounting brackets) in accordance with an embodiment of the present patent application.
Figure 8:
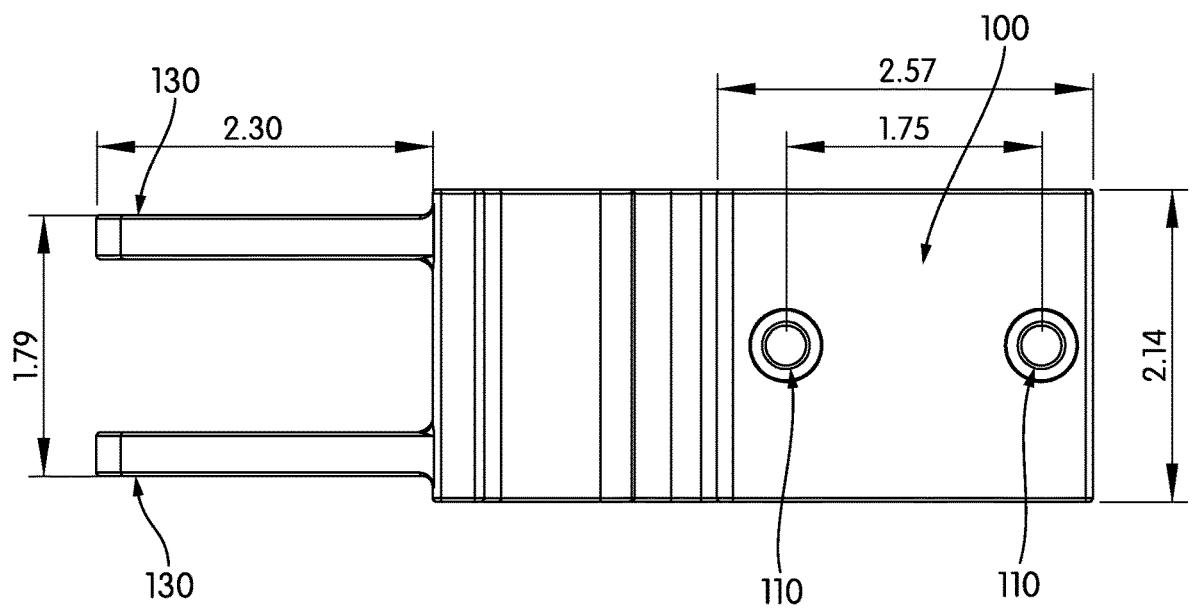
FIGS. 8, 9, 10, 11, and 12 show various views of the bracket that is attachable to the storage container to assist in transporting the storage container in accordance with an embodiment of the present patent application.
Figure 9:
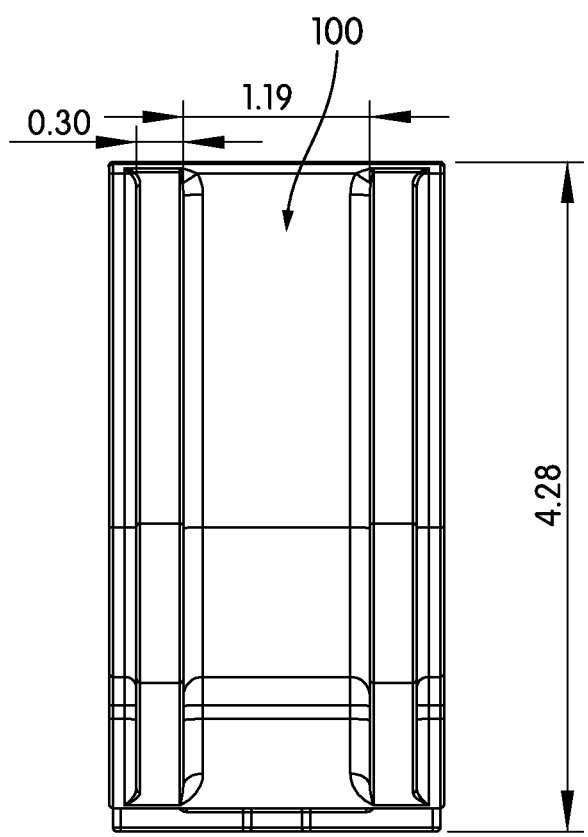
Figure 10:
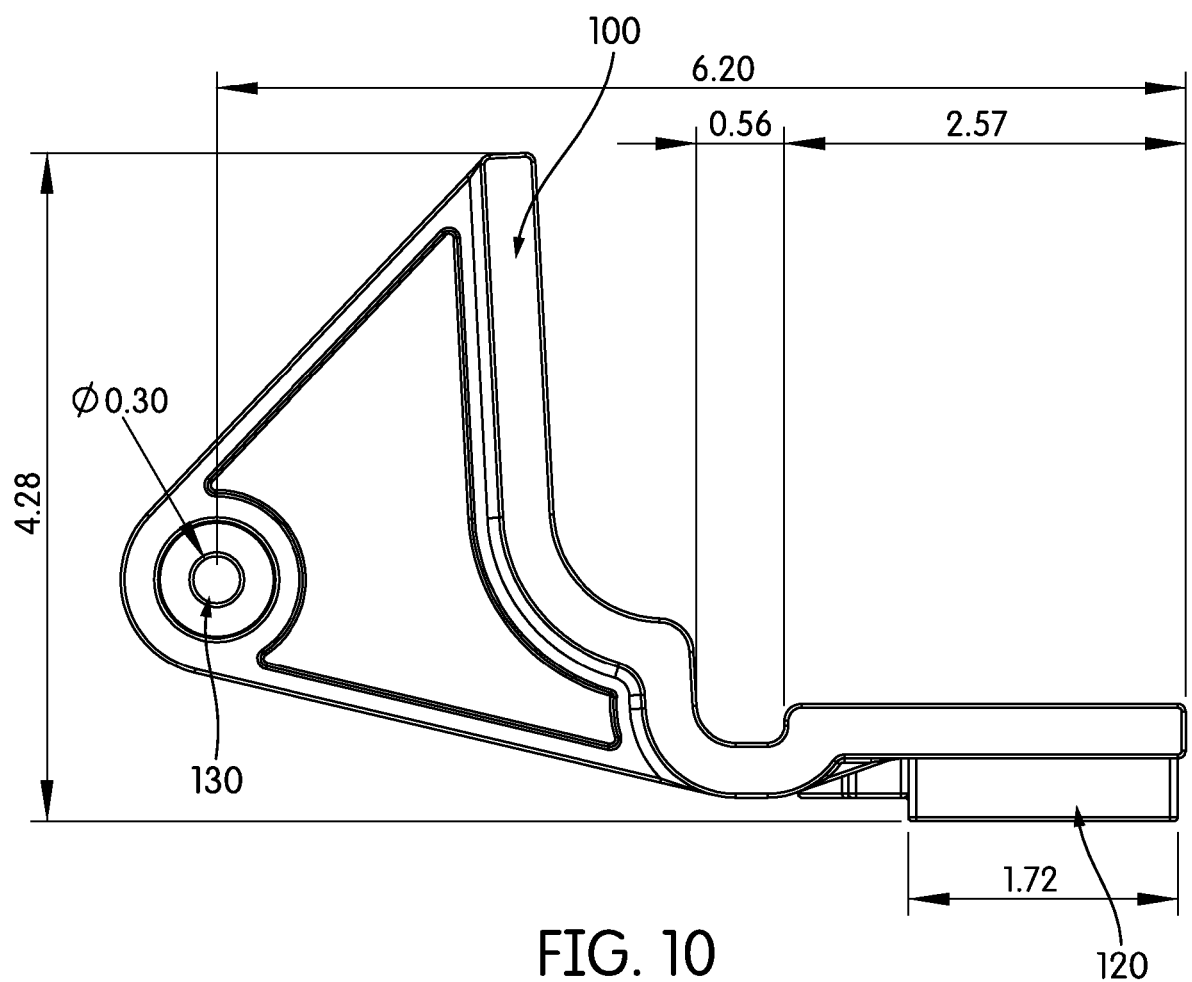
Figure 11:
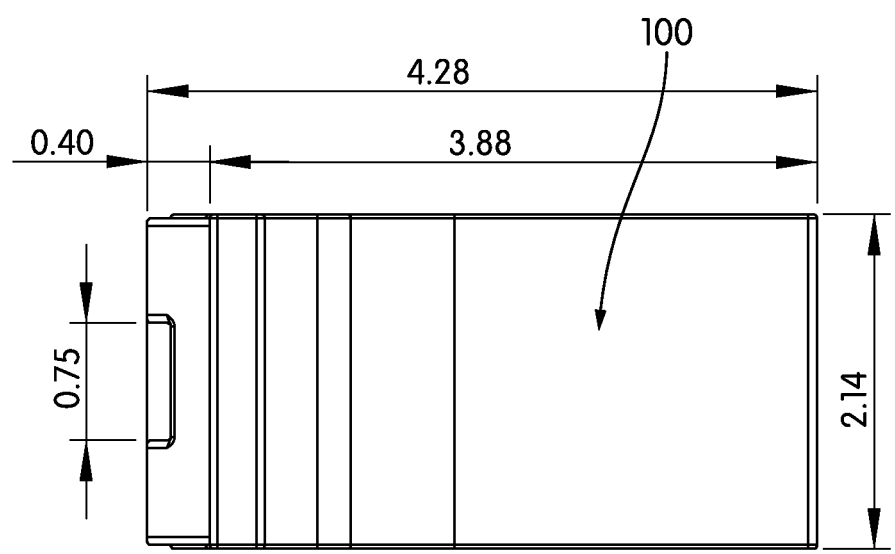
Figure 12:
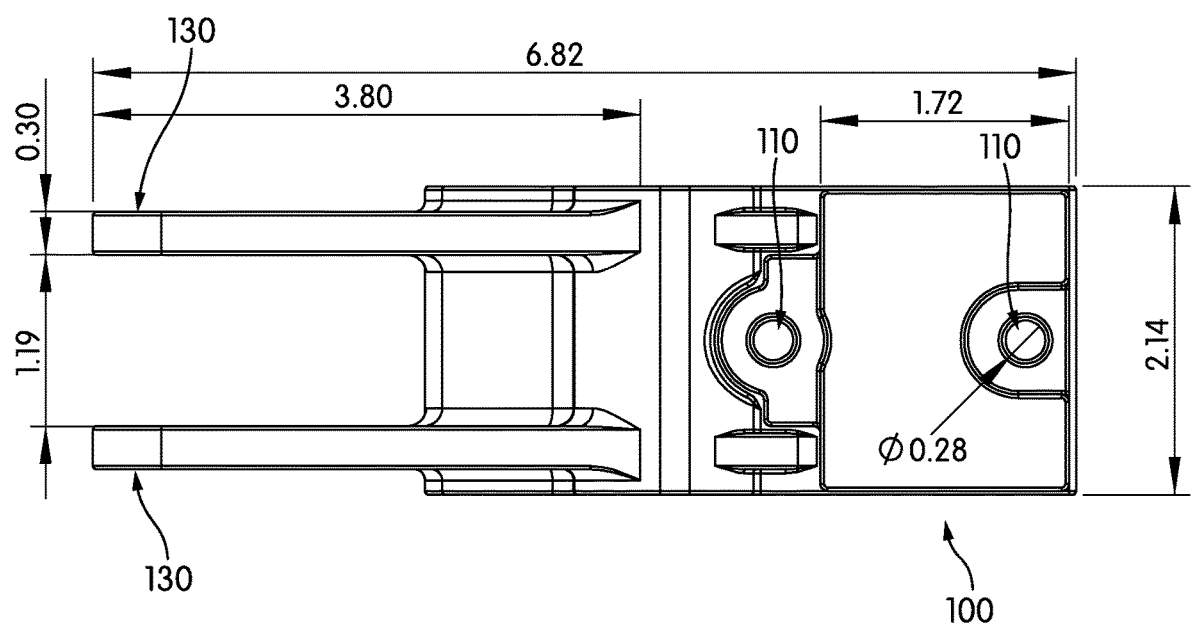

Referring to FIGS. 1-7C, one embodiment of the present patent application provides a wheel adapter 101 to convert the storage container 500 or $500_{NW}$ (as shown in FIG. 7A) to a wheeled storage container 500 or $500_W$ (as shown in FIGS. 7B-7C). That is, in one embodiment, the wheel adapter 100 provides a retrofit assembly that can be easily installed by the user U on any existing storage containers or coolers 500 or $500_{NW}$ (as shown in FIG. 7A) to convert the same into the wheeled storage container $500_W$ (as shown in FIGS. 7B-7C).

In one embodiment, the wheel adapter 101 comprises the mounting bracket 100 attachable to the storage container 500. In one embodiment, the mounting bracket 100 comprises a first leg 103 configured to engage a bottom surface 107 of the storage container 500 and a second leg 105 configured to engage a side surface 109 of the storage container 500. The second leg 105 comprises a wheel coupling 111. In one embodiment, the wheel adapter 101 also includes the wheel 530 rotatably connected to the wheel coupling 111. In one embodiment, as shown in FIG. 7C, the wheel 530 is constructed and arranged for rotation about an axis L-L to provide rolling support of the storage container 500 on the ground G.

In one embodiment, the storage container 500 is a cooler as described above. In one embodiment, the storage container 500 may be any storage container having a plurality of side walls 551 generally extending vertically upwardly from a bottom wall 553. In one embodiment, the plurality of side walls 551 are joined to each other to form a storage space, with an upwardly facing opening, in which articles/food items to be transported can be stored. In one embodiment, the storage container 500 may be a tool/outdoor equipment container.

In one embodiment, the storage container 500 includes a cover/lid 555 movable between an open condition permitting access to the storage space and a closed condition preventing access to the storage space. In one embodiment, the cover/lid 555 may be pivotally connected to the side walls 551 of the storage container 500. In one embodiment, the cover/lid 555 can be latched onto the side walls 551 of the storage container 500 via latches 579. The container latches 579 may vary in numbers (there may be one or more) and may be pivotable latches, buckles, or any other latching mechanism as would be appreciated by one skilled in the art. In one embodiment, the cover/lid 555 may be pivotally connected to the side walls 551 of the storage container 500 using hinges, pins, screws, fastenings, bolts, or any other connection mechanism 581 as would be appreciated by one skilled in the art. In one embodiment, the container latches 579 of the storage container 500 may comprise latch members that are constructed and arranged to engage with latch engaging portions. In one embodiment, the container latches 579 may be disengaged from latch engaging portions so that cover/lid 555 may be opened to allow access to the contents of the storage container 500.

In one embodiment, the storage container 500 also includes a manually engageable handle 557 and one or more ground engaging pads 559 removably attached to the bottom surface 107 of the bottom wall 553 of the storage container 500. In one embodiment, the one or more ground engaging pads 559 are configured to engage the ground G on which the storage container 500 is placed, when the storage container 500 is in the stationary configuration, such that the storage container is stationary relative to the ground G.

In one embodiment, the mounting bracket 100 is made of a metallic material. In another embodiment, the mounting bracket 100 is made of a plastic material, a hybrid material, a composite material or any other suitable material or combination of materials as would be appreciate by one skilled in the art.

In one embodiment, the first leg 103 and second leg 105 are 90 degrees to each other. In one embodiment, the angle is up to 5, 10 or 20 percent greater than or up to 5, 10 or 20 percent less than that described above.

In one embodiment, the first leg 103 and second leg 105 are connected to each other via a connecting portion 569. In one embodiment, the connecting portion 569 is constructed and arranged to wrap around the edge 583 of the storage container 500 when the mounting bracket 100 is attached to the storage container 500.

In one embodiment, the mounting bracket 100 is permanently attachable to the storage container 500. For example, the mounting bracket 100 is permanently attachable to the storage container 500 by using adhesive coatings on both container engaging surface 563 of the mounting bracket 100 and the bottom surface 107 of the storage container 500. In another embodiment, the mounting bracket 100 is detachably/removably attachable to the storage container 500. For example, the mounting bracket 100 is detachably/removably attachable to the storage container 500 by using fasteners or other attachment mechanisms.

In one embodiment, the mounting bracket 100 is attachable to the storage container 500 via only the first leg 103 of the mounting bracket 100. That is, only the first leg 103 of the mounting bracket 100 is (either detachably/removably or permanently) attached to the storage container 500 and the second leg 105 of the mounting bracket 100 is not attached/connected to the storage container 500.

In another embodiment, the mounting bracket 100 is attachable to the storage container 500 via both the first leg 103 and the second leg 105 of the mounting bracket 100. That is, the first leg 103 and the second leg 105 of the mounting bracket 100 are (either detachably/removably or permanently) attached to the storage container 500.

In yet another embodiment, the mounting bracket 100 is attachable to the storage container 500 via only the second leg 105 of the mounting bracket 100. That is, only the second leg 105 of the mounting bracket 100 is (either detachably/removably or permanently) attached to the storage container 500 and the first leg 103 of the mounting bracket 100 is not attached/connected to the storage container 500.

In one embodiment, the first leg 103 includes a ground engaging surface 561. In one embodiment, the ground engaging surface 561 includes the rubber or elastomeric pad 120 that is constructed and arranged to engage the ground G on which the storage container 500 is placed such that the storage container 500 is stationary relative to the ground G.

In one embodiment, the first leg 103 also includes the container engaging surface 563 opposite the ground engaging surface 561. In one embodiment, the container engaging surface 563 includes one or more openings 110 for receiving attachment members 510 (e.g., rivets, fasteners, and other attachment mechanisms known in the art may be used) for attaching the mounting bracket 100 to the storage container 500. In one embodiment, the container engaging surface 563 is constructed and arranged to be attachable to the bottom surface 107 of the bottom wall 553 of the storage container 500. In one embodiment, the one or more openings 110 on the container engaging surface 563 are optional. In one embodiment, the container engaging surface 563 is constructed and arranged to be adhesively attachable to the bottom surface 107 of the storage container 500. In another embodiment, the one or more openings 110 on the container engaging surface 563 may be filled with adhesive material when the container engaging surface 563 is adhesively attached to the bottom surface 107 of the bottom wall 553 of the storage container 500.

In one embodiment, the second leg 105 includes a side engaging surface 565 that is constructed and arranged to be removably attachable to the outer side surface 109 of the side wall 551 of the storage container 500. In one embodiment, the side engaging surface 565 includes one or more openings 567 for receiving attachment members (e.g., rivets, fasteners, and other attachment mechanisms known in the art may be used) for attaching the mounting bracket 100 to the storage container 500. In one embodiment, the one or more openings 567 on the side engaging surface 565 are optional. In one embodiment, the side engaging surface 565 is constructed and arranged to be adhesively attachable to the outer side surface 109 of the side wall 551 of the storage container 500. In another embodiment, the one or more openings 567 on the side engaging surface 565 may be filled with adhesive material when the side engaging surface 565 is adhesively attached to the outer side surface 109 of the side wall 551 of the storage container 500.

In one embodiment, instead of two mounting brackets 100 as described above, a single mounting bracket may be attached to the storage container 500. In such an embodiment, the single mounting bracket may be positioned centrally along the bottom edge 583 of the storage container 500. In one embodiment, the single mounting bracket includes a first leg and a second leg. In one embodiment, the first leg and the second leg of the single mounting bracket have same shape, structure, operation and configuration as the first leg and the second leg of the mounting bracket 100. In one embodiment, the first leg and the second leg of the single mounting bracket are longer and/or or wider than the first leg and the second leg of the mounting bracket 100. In one embodiment, the single mounting bracket is configured to support two wheels 530 thereon.

In one embodiment, the wheel coupling 111 includes the axle receiving opening(s) 130 that is configured to receive the axle 131 of the wheel 530 therein. In one embodiment, the axle receiving openings 130 are positioned higher than the ground engaging surface 561. As shown in FIG. 7B, the axle receiving openings 130 are positioned by a distance "h" higher than the ground engaging surface 561. In one embodiment, the positioning of the axle receiving openings 130 allows a wheel configuration in which the wheel 530 is slightly elevated and is normally not in contact with the ground surface G (e.g., as shown in FIG. 7B) when the storage container 500 is in a stationary configuration in which the storage container 500 is placed such that the storage container 500 is stationary relative to the ground G.

In one embodiment, the axle 131 is mounted to the wheel coupling 111 through the pair of axially aligned throughholes 130 formed in the wheel coupling 111. In one embodiment, the wheel 530 is a molded structure reinforced by a plurality of wheel ribs 531. In one embodiment, the wheels 530 may have rubber treads or other anti-slip material provided on the surface to provide friction with the ground G when the store container 500 is to be rolled from one location to another. In one embodiment, each wheel 530 is mounted on the elongated axle 131 by any appropriate structure in conventional fashion. In one embodiment, the bracket 100, the axle 131 and the wheel 530 are configured to provide added structural integrity with minimum added weight.

In one embodiment, grooves may be formed on the surface of the handle 557 or rubber material or other anti-slip material may be provided on at least a portion of the handle 557 to facilitate the grasping of the handle 557. In one embodiment, as shown in FIG. 7C, the handle 557 and the wheels 530 are arranged to enable the user U to manually grasp the handle 557 so as to tilt the storage container 500 to a tilted rolling movement position, thereby enabling the user U to roll the storage container 500 to a desired location by moving the handle 557 in a desired direction. In one embodiment, as shown in FIGS. 7A-7C, the handle 557 is provided on one side 551$h$ of the storage container 500 and the mounting brackets 100 are attached on the other side 551$m$ of the storage container 500.

In one embodiment, the one or more pads 559 on the bottom of the storage container 500 are optional. In such an embodiment, the mounting bracket(s) 100 may be directly attached (i.e., either permanently or detachably/removably) to the bottom surface of the bottom wall of the storage container 500. In one embodiment, the mounting bracket(s) 100 are directly attached on one bottom edge/side of the bottom wall of the storage container 500. In one embodiment, the first leg 103 of the mounting bracket 100 does not include the pad 120 thereon. In one embodiment, the wheel adapter/retrofit assembly may include adjuster members that have the same thickness as the first leg 103 of the mounting bracket 100 and that are attached on the other side/bottom edge of the storage container 500 (i.e., not on the same bottom edge/side of the storage container 500 on which the mounting bracket(s) 500 are attached) so as to stabilize the storage container 500 when the storage container 500 is set in place.

As shown in FIG. 7A, the user U may have storage container 500 or 500$_{NW}$ without any wheels attached to it. Such a storage container rests solely upon the ground G e.g., via the ground engaging pads 559 as shown in FIG. 7A.

In one embodiment, the user U may purchase the retrofit wheel adapter assembly 100 as disclosed by the present patent application. This wheel adapter assembly 100 can be easily installed by the user U on his/her existing storage containers or coolers 500 or 500$_{NW}$ (as shown in FIG. 7A) to convert the same into the wheeled storage container 500$_W$ (as shown in FIGS. 7B-7C). The procedures for attaching the wheel adapter 101 to the storage container 500 and the use of the wheeled storage container 500$_W$ are described with respect to FIGS. 5-7C.

In one embodiment, the user U may detach two of the pads 559 from the same bottom edge 583 (see FIGS. 5-7C) of the storage container 500 by removing the pads' corresponding fasteners. The storage container 500, at this point, has two pads 559 still attached (on the opposite edge 585, see FIGS. 6-7C) to the bottom of the cooler 500 and two empty holes 110 (such as screw or bolt holes) in the first corner 587 and two empty holes 110 (such as screw or bolt holes) in the second corner 589. In one embodiment, the first corner 587 and the second corner 589 are along the same bottom edge 583 of the storage container 500. In one embodiment, the user U may attach the first mounting bracket 100 to the first bottom corner 587 of the storage container 500 and the second mounting bracket 100 to the second bottom 589 corner of the storage container 500 as illustrated in FIGS. 5-7C. This configuration allows the mounting brackets 100 to be attached to the storage container 500 using one or more fasteners without having to create or drill new holes 110 in the storage container 500. In other words, the mounting brackets 100 may use the same existing holes 110 (and their associated/corresponding fastener elements) in the storage container 500 as the removed pads.

It is also contemplated, that the retrofit wheel adapter assembly 100 of the present patent application may be attachable to the storage container 500 without any pads or any removable pads. For example, as described in detail above, in such an embodiment, the retrofit wheel adapter assembly 100 is directly attachable to the bottom surface of the storage container 500. In one embodiment, adjuster elements have the same thickness as the first leg 103 of the mounting bracket 100 may be attached to the under surface of the storage container 500 on the bottom edge 585 (i.e., opposite the bottom edge 583 on which the two mounting brackets 100 are attached) to adjust the level of the storage container 500 when the storage container 500 is stationarity placed on the surface. In one embodiment, the adjuster elements are provided in the retrofit wheel adapter assembly 100. In one embodiment, the adjuster elements may be any rubber or any anti-skid material pads that are easily obtained by the user U.

FIG. 7B shows the wheeled storage container $500_W$. That is, the wheel adapter 101 of the present patent application is attached to the storage containers or coolers 500 or $500_{NW}$ of FIG. 7A to convert it to the wheeled storage container $500_W$ of FIG. 7B. As shown in FIG. 7B, the wheeled storage container $500_W$ is supported by two original pads 559 and two new pads 120 that are part of the mounting bracket 100 when the wheeled storage container $500_W$ is at rest on the ground G as illustrated in FIG. 7B. When the wheeled storage container $500_W$ is at rest on the ground G, the wheels 530 are slightly elevated and not touching the ground G. In another embodiment, when the wheeled storage container $500_W$ is at rest on the ground G, the wheels 530 are only lightly in contact with the ground G.

In this embodiment, when the wheeled storage container $500_W$ is tilted by the user U grasping the handle 557 and raising one end of the wheeled storage container $500_W$ to a tilted rolling movement position as shown in FIG. 7C, thereby enabling the wheeled storage container $500_W$ to be rolled by the wheels 530, the bottom surface of the wheeled storage container $500_W$ is lifted from the ground G so that only the wheels 530 engage the ground G.

In one embodiment, the dimensions described in the present patent application (e.g., FIGS. 8-12), are up to 5 percent greater than or up to 5 percent less than those described above. In one embodiment, the dimensions described in the present patent application (e.g., FIGS. 8-12), are up to 10 percent greater than or up to 10 percent less than those described above. In one embodiment, the dimensions described in the present patent application (e.g., FIGS. 8-12), are up to 20 percent greater than or up to 20 percent less than those described above. In one embodiment, all the dimensions shown in the present patent application are in inches, in degrees or in feet.

While the present patent application has been described by replacing preexisting pads on a cooler with wheels, it should be appreciated that the present patent application may also be practiced by placing the described bracket, pads and wheels on a new cooler. Also, while the present patent application has been described as having two fasteners per original pad and bracket, any number and layout or pattern of fasteners may be used.

Although the present patent application has been described in detail for the purpose of illustration, it is to be understood that such detail is solely for that purpose and that the present patent application is not limited to the disclosed embodiments, but, on the contrary, is intended to cover modifications and equivalent arrangements that are within the spirit and scope of the appended claims. In addition, it is to be understood that the present patent application contemplates that, to the extent possible, one or more features of any embodiment can be combined with one or more features of any other embodiment.

What is claimed is:

1. A method for upgrading a cooler, the method comprising:
   replacing a first original pad with a first bracket at a first bottom corner of the cooler; and
   replacing a second original pad with a second bracket at a second bottom corner of the cooler;
   wherein the first bracket and the second bracket each comprise:
   a first leg;
   a second leg;
   a rubber pad attached to a bottom of the first leg and having a ground engaging surface that contacts a ground on which the cooler is placed when the cooler is in a stationary configuration;
   a connecting portion connecting the first leg and the second leg, the connecting portion elevated relative to the ground engaging surface of the rubber pad, wherein the connecting portion does not contact the ground when the cooler is in the stationary configuration; and
   a wheel coupling attached to the second leg and including a wheel, wherein the wheel contacts the ground when the cooler is in a rolling configuration.

2. The method of claim 1, wherein, in the stationary configuration, the wheel of the first bracket and the wheel of the second bracket do not contact the ground.

3. The method of claim 1, wherein the first original pad is attached to the cooler with a first pair of fasteners, and wherein the first bracket is attached to the cooler using the first pair of fasteners when the first original pad is replaced with the first bracket.

4. The method of claim 3, wherein the first leg of the first bracket comprises a pair of holes through which the first pair of fasteners pass.

5. The method of claim 1, wherein the second original pad is attached to the cooler with a second pair of fasteners, and wherein the second bracket is attached to the cooler using the second pair of fasteners when the second original pad is replaced with the second bracket.

6. The method of claim 5, wherein the first leg of the second bracket comprises a pair of holes through which the second pair of fasteners pass.

7. The method of claim 1, wherein a top of the first leg of each of the first bracket and the second bracket comprises a container engaging surface.

8. The method of claim 7, wherein the container engaging surface of the first bracket and the second bracket adhesively attaches to the cooler.

9. The method of claim 1, wherein the second leg of each of the first bracket and the second bracket comprises a side engaging surface that engages a side of the cooler.

10. The method of claim 9, wherein the side engaging surface of the first bracket and the second bracket adhesively attaches to the cooler.

11. The method of claim 1, wherein the connecting portion of the first bracket and the second bracket has a U shape.

12. The method of claim 1, wherein, when the cooler is in the stationary configuration, the ground engaging surface of the rubber pad of the first bracket is the only portion of the first bracket that contacts the ground, and the ground engaging surface of the rubber pad of the second bracket is the only portion of the second bracket that contacts the ground.

\* \* \* \* \*